March 31, 1931    T. ROGHMANNS    1,798,852
SINGLE RAIL RAILWAY
Filed June 19, 1930
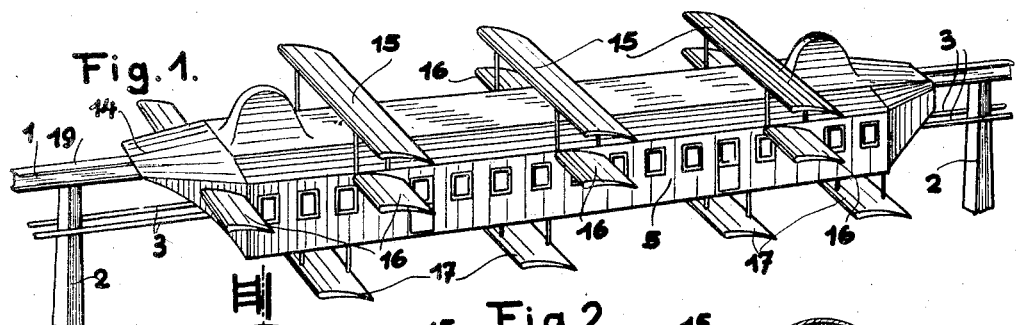
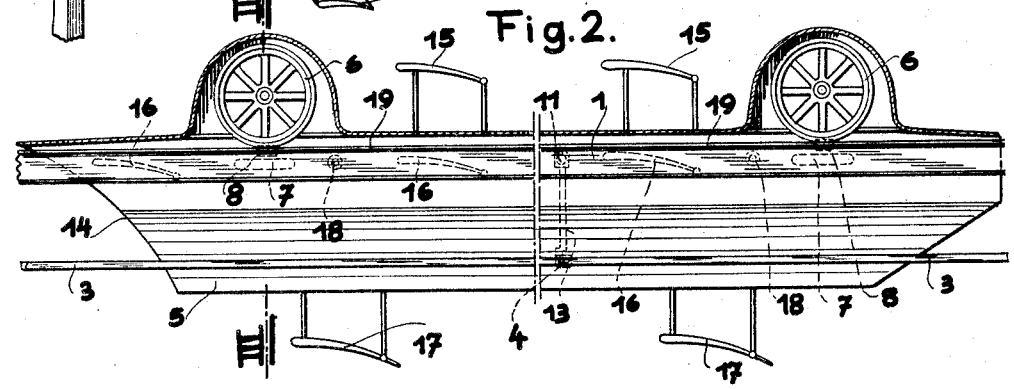
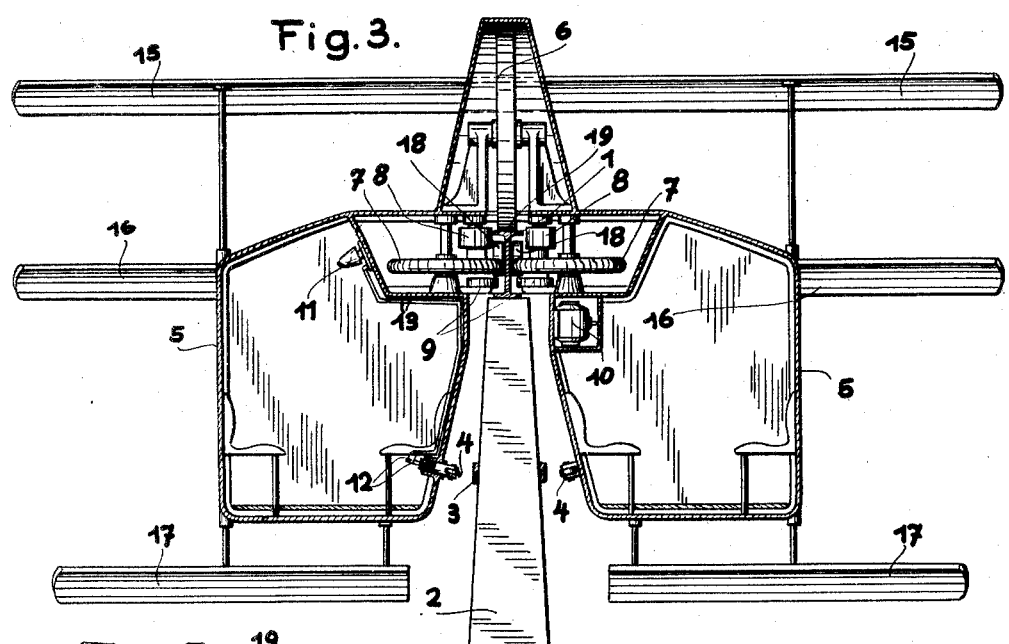
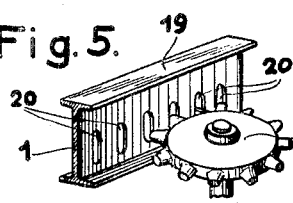
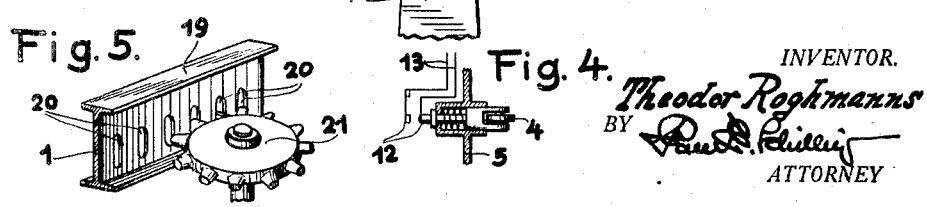
INVENTOR.
Theodor Roghmanns
BY
ATTORNEY Patented Mar. 31, 1931

1,798,852

UNITED STATES PATENT OFFICE

THEODOR ROGHMANNS, OF SONSBECK/NIEDERRHEIN, GERMANY

SINGLE-RAIL RAILWAY

Application filed June 19, 1930, Serial No. 462,198, and in Germany March 29, 1927.

This invention has reference to one-rail railroads and it refers particularly to single-rail elevated or suspension railroads which are provided with stabilizing and supporting means by which carriers may be balanced and kept in the proper position while in operation, and which may be provided with suspension cars having driving wheels or the like which are provided with hard rubber or pneumatic tires adjacent the guide rail; the said carriage being provided with propelling means. The invention is intended to increase the speed and safety of operation of this kind of vehicles and to facilitate the manipulation thereof. In view of the fact that the propulsion of this kind of conveyances is effected substantially free from jerks which otherwise occur in the case of propelling gears, racks, pushing means and the like and with a minimum of or substantially no friction a very high rate of speed may be produced with such vehicles, the spring action of which is usually obtained by means of air cushions. Such instrumentalities are usually provided with wing-like planes or supporting airfoils at their front ends as well as at their sides and at their upper and lower portions, particularly in the case of operating on large distance travel, such planes or the like causing the car to be lifted off from the guide rail by aerodynamic means when at full speed so as to produce an upwardly directed pressure and causing the driving wheels to slide upwards along the rail and producing a very smooth, rapid uniform and regular driving action, free from jerks, jars and other irregular movement, while the track is substantially relieved from the action of the weight and of the pressure of the practically floatingly moving vehicle. The new kind of railroad according to this invention may be constructed in such a manner that it may be operated on all kinds of streets and roads above the ordinary carriage traffic, so that it will be possible to dispense with the necessity of ordinary street cars and car tracks and to do away with the liability of accidents and the confusion of traffic, so as to thereby considerably relieve and remedy the usual congestion of traffic and the trouble resulting therefrom in large cities.

The invention will be more particularly described with reference to the accompanying drawing showing by way of exemplification an embodiment of the invention as applied to a suspension railroad. In Fig. 1 the invention is shown diagrammatically in perspective view; Fig. 2 is a vertical longitudinal section and Fig. 3 is a cross-sectional view on the line III—III of Fig. 2 and on an enlarged scale. Figures 4 and 5 are details to be referred to.

The driving rail 1 may be supported on standards or pillars of iron, concrete or the like indicated at 2 which, if erected in the streets, may be preferably arranged in a line with the posts for the street lanterns or the like and which may be connected by struts, hangers or the like 3 underneath the rail 1, the struts or the like 3 serving as guiding means for the rollers 4 of the carriages 5. The carriages are suspended from the driving rail 1 by means of the driving wheels or rollers 6 which are adapted for movement along the rail and support the two sections of the carriage 5 in accordance with the so-called "riding seat" or straddling construction. The driving wheels 7 which are adapted for rotation in the horizontal plane are arranged to become engaged laterally with the web portion of the rail, and cooperate with special supporting rollers 8 which are rotatable on their pivots with some play and are adapted for engagement with the rail 1 so as to insure the upright position of the vehicle both during operation and in the inoperative stage. The wheels 7 are provided with pneumatic or hard-rubber or equivalent tires by means of which a smooth and elastic and regular drive of the vehicle, free from jerks, blows or the like is obtained. In the case of the tires of the wheels becoming damaged or punctured special driving wheels 9 provided with hard-rubber tires will become operative. It is the intention of the inventor that the hard rubber tires are to be located a distance from the rail which is less than the cross section of the pneumatic tire. The driving may preferably be effected by means of electric motors 10 from which the wheels 7 at one or both sides of the driving rail are operated. In a preferred construction special signaling means, such as bells or the like 11 may be provided which, in the case of lack of uniformity of weight of the two sections of the carriage, as for instance at the time of mounting and alighting of passengers as well as during operation, will indicate and control or regulate the required balancing of the weight. This may for instance be effected by causing the spring supported rollers 4 of one side of the carriages to effect the closing of contacts 12 of the electric signaling lines 13 operating alarm bells or the like.

In the exemplification shown in the drawing the front portion 14 of the carriage 5 is constructed somewhat similar to the usual aerofoils or wing-like supporting planes. There are moreover provided additional adjustable supporting airfoils 15, 16, 17 by means of which at great velocity the carriages will be lifted off the driving rail 1 by aerodynamic means and in a regulatable manner so that the particular carriage has a floating or flying movement with the wheels 7 engaging the web of the rail at a higher point than in the inoperative position. By the action of the rollers 18 which become engaged with the flanges 19 of the rail 1, the raising of the vehicle is restricted.

In the case of appreciable gradients or ascending movement the rail 1, as shown in Fig. 5 of the drawing the rail may be provided with oblong or elongated apertures 20 or ribs with which the teeth of the driving wheels 21, which is a modified form of driving means, are adapted to engage, both in the starting movement as well as during operation, when the car is floating or flying at a distance of about 4½ to 6 inches from the normal.

The invention has been described herein in its broad features only, and it should be understood that it is not restricted to the particular arrangement, proportions and sizes of parts, and it is susceptible of modifications and changes within the limit of the claims hereunto appended.

I claim:—

1. A single-rail railroad comprising a guiding drive rail and a substantially cross sectionally U-shaped carriage having areodynamic supporting means, the carriage being straddlingly and movably suspended from said rail, horizontally rotatable driving wheels on said carriage engaging a vertical web portion of the rail, and means for operating the driving wheels.

2. A single-rail railroad comprising a guiding drive rail having a vertical web and a car centrally supported from said rail, and oppositely disposed, horizontally rotatable driving wheels on the car engaging opposite sides of the vertical web of the rail, resilient tires on said wheels, and guiding and stabilizing means on the car engaging the head portions of the rail.

3. A single-rail railroad comprising a guiding drive rail and a cross-sectionally U-shaped bisectional car straddlingly movable along said rail, a supporting wheel centrally disposed on said car and supported upon the head of the rail for rotation in the vertical plane, oppositely disposed horizontally rotatable driving wheels on the car engaging opposite sides of the web of the rail, stabilizing means disposed on said car, and operating means for the driving wheels.

4. A single-rail railroad comprising a guiding drive rail, a carriage straddlingly supported on said rail and movable along the same, complemental driving means on the car engaging opposite sides of the web of the rail, resiliently mounted steadying rollers on said car engaging opposite sides of the head of the rail and aerofoil-like stabilizing means at the upper and lower portion of the carriage and on the side portions thereof.

5. A single-rail railroad comprising a guiding drive rail, a car straddlingly supported on said rail and movable along the same, driving means on the car engaging opposite sides of the web of the rail, steadying means engaging the head of the rail, supporting means for the rail and complemental electric contacts respectively disposed on the car and on said supporting means and conductors for a signalling circuit connected to the contacts.

In testimony whereof I affix my signature.

THEODOR ROGHMANNS.